(12) United States Patent
Abts et al.

(10) Patent No.: US 8,285,789 B2
(45) Date of Patent: Oct. 9, 2012

(54) FLATTENED BUTTERFLY PROCESSOR INTERCONNECT NETWORK

(75) Inventors: Dennis C. Abts, Eleva, WI (US); John Kim, Glenview, IL (US); William J. Dally, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 12/195,190

(22) Filed: Aug. 20, 2008

(65) Prior Publication Data

US 2009/0106529 A1    Apr. 23, 2009

Related U.S. Application Data

(60) Provisional application No. 60/977,816, filed on Oct. 5, 2007.

(51) Int. Cl.
G06F 15/16 (2006.01)
G06F 15/76 (2006.01)

(52) U.S. Cl. ....................................... 709/205

(58) Field of Classification Search .................. 709/201, 709/20, 205, 218; 712/28
See application file for complete search history.

(56) References Cited

OTHER PUBLICATIONS

Kim et al. "Flattened butterfly: a cost-efficient topology for high-radix networks" ACM SIGARCH Computer Architecture News. vol. 35 Issue 2, May 2007.*
Kim, John, et. al. Flattened Butterfy Topology for On-Chip Networks. IEEE Computer Architecture Letters, vol. 6, No. 2, Jul.-Dec. 2007.*
Internet Archive Wayback Machine. Computer Architecture Letters. Sep. 5, 2007. <http://web.archive.org/web/20070905030220/http://www.cs.virginia.edu/~tcca/2007paps.html> Jan. 9, 2012.*

* cited by examiner

*Primary Examiner* — Philip Chea
(74) *Attorney, Agent, or Firm* — Blakely, Sokoloff, Taylor & Zafman LLP

(57) ABSTRACT

A multiprocessor computer system comprises a folded butterfly processor interconnect network, the folded butterfly interconnect network comprising a traditional butterfly interconnect network derived from a butterfly network by flattening routers in each row into a single router for each row, and eliminating channels entirely local to the single row.

18 Claims, 4 Drawing Sheets

US 8,285,789 B2

FLATTENED BUTTERFLY PROCESSOR INTERCONNECT NETWORK

CLAIM OF PRIORITY

This application claims priority to provisional patent application "Arrangements and Methods of Data Processing Using High-Radix, Multiprocessor Topology", filed Oct. 5, 2007, Ser. No. 60/977,816, and incorporates such by reference as an example embodiment of the invention.

FIELD OF THE INVENTION

The invention relates generally to computer interconnect networks, and more specifically in one embodiment to a flattened butterfly processor interconnect network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computer systems have long relied on network connections to transfer data, whether from one computer system to another computer system, one computer component to another computer component, or from one processor to another processor in the same computer. Most computer networks link multiple computerized elements to one another, and include various functions such as verification that a message sent over the network arrived at the intended recipient, confirmation of the integrity of the message, and a method of routing a message to the intended recipient on the network.

Processor interconnect networks are used in multiprocessor computer systems to transfer data from one processor to another, or from one group of processors to another group. The number of interconnection links can be very large with computer systems having hundreds or thousands of processors, and system performance can vary significantly based on the efficiency of the processor interconnect network. The number of connections, number of intermediate nodes between a sending and receiving processing node, and the speed or type of connection all play a factor in the interconnect network performance.

Similarly, the network topology, or pattern of connections used to tie processing nodes together affects performance, and remains an area of active research. It is impractical to directly link each node to each other node in systems having many tens of processors, and all but impossible as the number of processors reaches the thousands.

Further, the cost of communications interfaces, cables, and other factors can add significantly to the cost of poorly designed or inefficient processor interconnect networks, especially where long connections or high-speed fiber optic links are required. A processor interconnect network designer is thereby challenged to provide fast and efficient communication between the various processing nodes, while controlling the number of overall links, and the cost and complexity of the processor interconnect network.

The topology of a network, or the method used to determine how to link a processing node to other nodes in a multiprocessor computer system, is therefore an area of interest.

SUMMARY

The invention comprises in one example a multiprocessor computer system comprising a folded butterfly processor interconnect network, the folded butterfly interconnect network comprising a traditional butterfly interconnect network derived from a butterfly network by flattening routers in each row into a single router for each row, and eliminating channels entirely local to the single row.

The examples presented here illustrate some embodiments of the flattened butterfly topology that include developments in high-radix routers and global adaptive routing to construct a cost-effective network. The flattened butterfly gives lower hop count than a folded Clos and better path diversity than a conventional butterfly. As a result, the flattened butterfly is approximately half the cost of a folded Clos network of identical capacity on load-balanced traffic.

DETAILED DESCRIPTION

Figure 1:
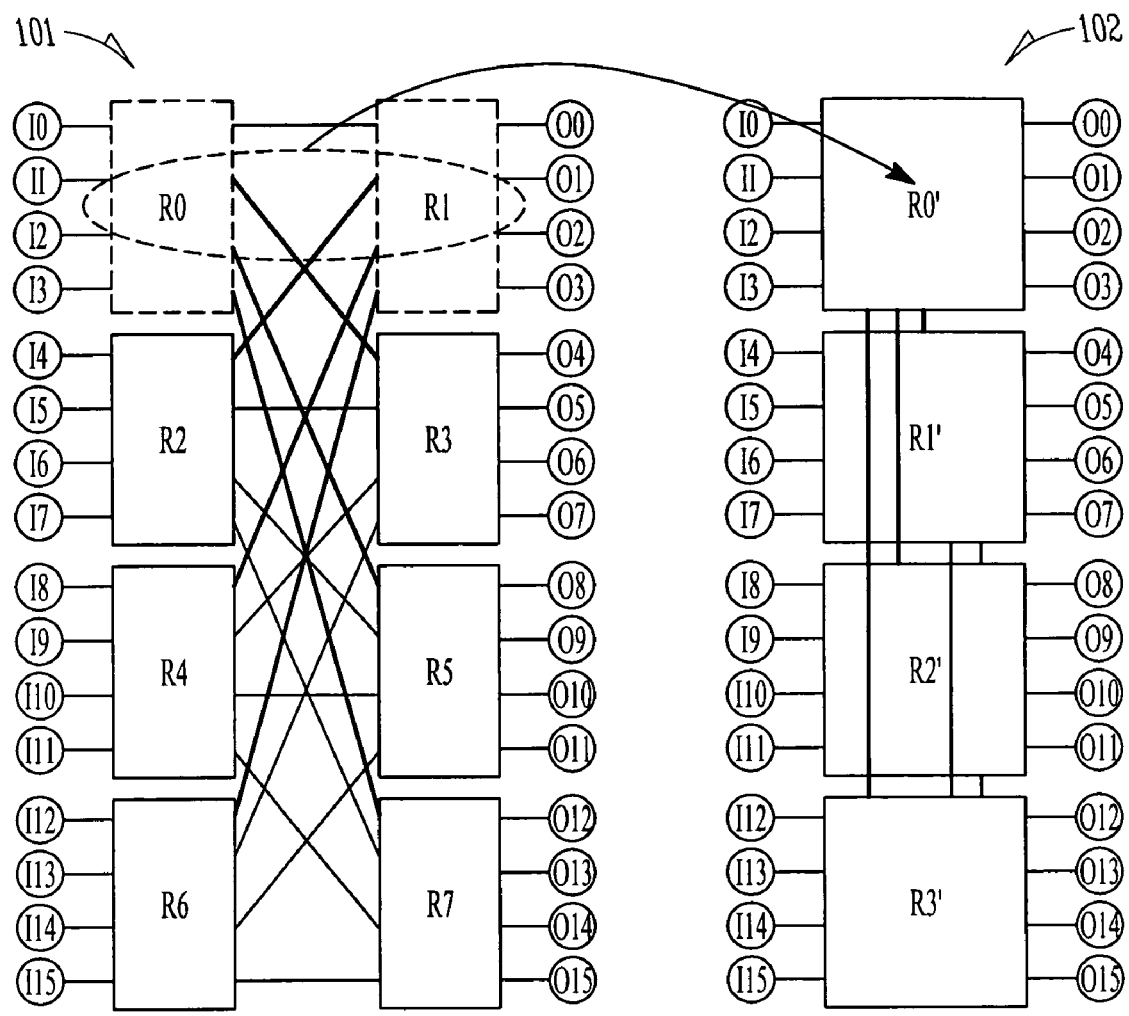
FIG. 1 is a block diagram of a 4-ary 2-fly butterfly network flattened into a 4-ary 2-flat flattened butterfly network, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Interconnection networks are widely used to connect processors and memories in multiprocessors, as switching fabrics for high-end routers and switches, and for connecting I/O devices. As processor and memory performance continues to increase in a multiprocessor computer system, the performance of the interconnection network plays a central role in determining the overall performance of the system. The latency and bandwidth of the network largely establish the remote memory access latency and bandwidth. Over the past 20 years k-ary n-cubes have been widely used—examples of such networks include SGI Origin 2000, Cray T3E, and Cray XT3. However, the increased pin density and faster signaling rates of modern ASICs is enabling high-bandwidth router chips with >1 Tb/s of off-chip bandwidth.

Low-radix networks, such as k-ary n-cubes, are unable to take full advantage of this increased router bandwidth. To take advantage of increased router bandwidth requires a high-radix router—with a large number of narrow links, rather than a conventional router with a small number of wide links. With modern technology, high-radix networks based on a folded-Clos (or fat tree) topology provide lower latency and lower cost than a network built from conventional low-radix routers.

In one embodiment of the invention, a high-radix flattened butterfly topology provides better path diversity than a conventional butterfly and has approximately half the cost of a comparable performance Clos network on balanced traffic. The flattened butterfly is similar to a generalized hypercube network, but by utilizing concentration, the flattened butterfly can scale more effectively and also exploit high radix routers.

Routing algorithms on the flattened butterfly have been compared, and global-adaptive routing is preferred in some embodiments to load-balance the topology. Some "greedy" implementations of global-adaptive routing algorithms give poor instantaneous load-balance. Some embodiments use a sequential implementation of the UGAL routing algorithm that overcomes this load-imbalance, while other embodiments use the CLOS AD routing algorithm that removes transient load imbalance, as the flattened butterfly is routed similar in some aspects to a folded-Clos network. In addition to providing higher performance, a flattened butterfly topology has a favorable cost compared to other high-radix topologies.

The butterfly network (k-ary n-fly) can take advantage of high-radix routers to reduce latency and network cost. However, there is no path diversity in a butterfly network, which results in poor throughput for adversarial traffic patterns. Also, a butterfly network cannot exploit traffic locality. A Clos network provides many paths between each pair of nodes, such that the path diversity enables the Clos to route arbitrary traffic patterns with no loss of throughput. The input and output stages of a Clos network can be combined or folded on top of one other creating a folded Clos or fat tree network, which can exploit traffic locality. A Clos or folded Clos network, however, has a cost that is nearly double that of a butterfly with equal capacity and has greater latency than a butterfly.

The increased cost and latency both stem from the need to route packets first to an arbitrary middle stage switch and then to their ultimate destination. This doubles the number of long cables in the network, which approximately doubles cost, and doubles the number of inter-router channels traversed, which drives up latency.

The flattened butterfly topology presented here is a topology that exploits high radix routers to realize lower cost than a Clos on load-balanced traffic, and provide better performance and path diversity than a conventional butterfly.

Figure 2:
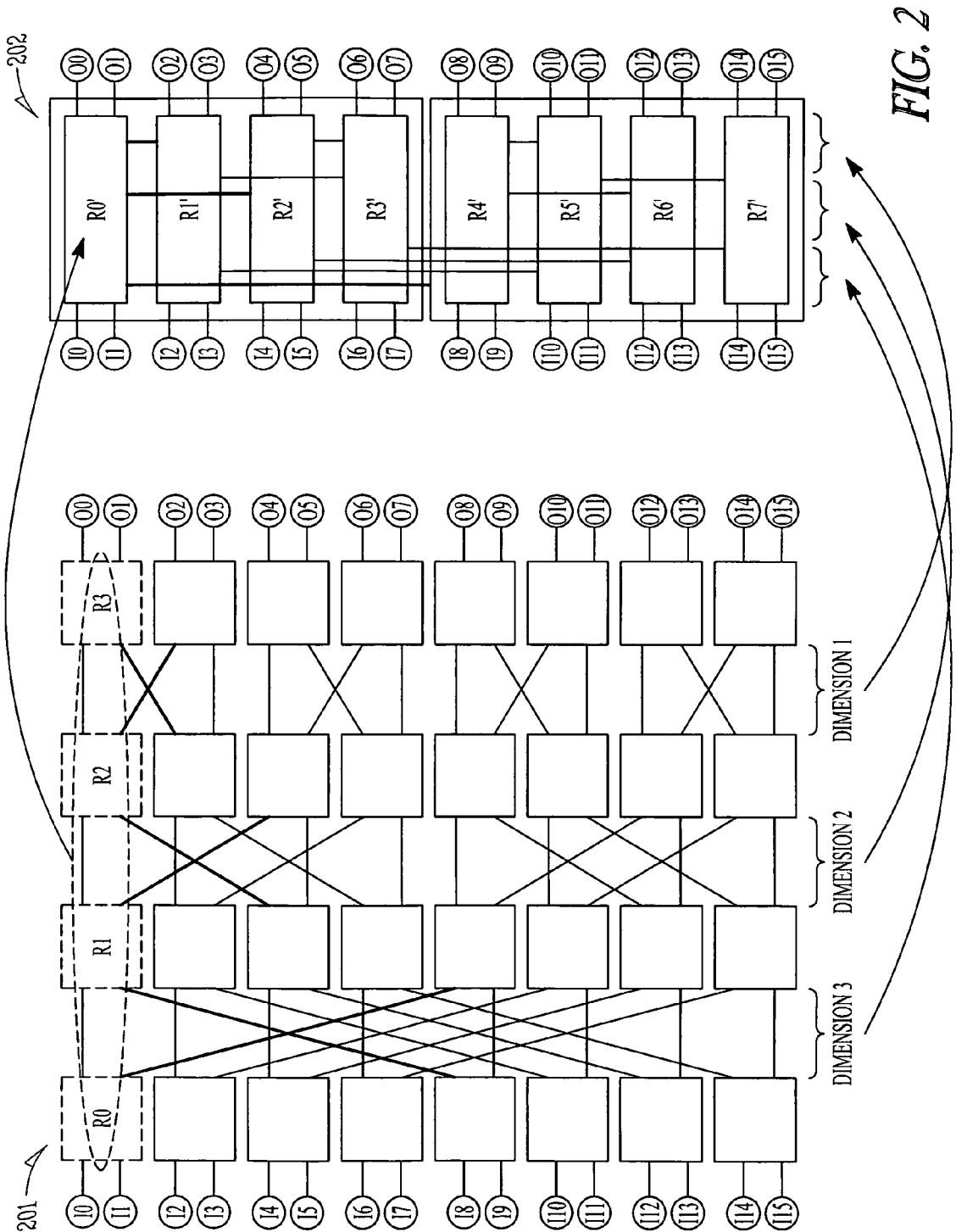
FIG. 2 is a block diagram of a 2-ary 4-fly butterfly network flattened into a 2-ary 4-flat flattened butterfly network, consistent with an example embodiment of the invention.

An example flattened butterfly topology is presented in FIGS. 1 and 2. In FIG. 1, a conventional butterfly (k-ary n-fly) shown at 101 is flattened by combining or flattening the routers in each row of the network into a single router, as shown at 102. A k-ary, n-fly network has n stages of switches or routers (dimension), k inputs and outputs per switching node (radix), $k^n$ source and destination nodes, and $k^{n-1}$ switching nodes in each dimension.

The butterfly topology shown at 101 is a 4-ary 2-fly network, using four nodes (4-ary) in each dimension and two dimensions or columns (2-fly). Similarly, the butterfly topology shown at 201 of FIG. 2 is a 2-ary 4-fly network, containing two nodes in each dimension (2-ary) and organized into four columns or dimensions (4-fly). The 4-ary 2-fly network 101 of FIG. 1 is flattened into a 4-ary 2-flat flattened butterfly network at 102, and in FIG. 2, the 2-ary 4-fly network shown at 201 is flattened into a 2-ary 4-flat flattened butterfly network.

To flatten the butterfly network 101 of FIG. 1, the routers R0 and R1 from the first row are combined into a single router R00 in the flattened butterfly at 102. Similarly, routers R0, R1, R2, and R3 at 201 of FIG. 2 are combined into R00 of the flattened butterfly network at 202.

As a row of routers is combined, channels entirely local to the row, such as channel (R0,R1) in the butterfly network at 101, are eliminated. All other channels of the original butterfly remain in the flattened butterfly. For example, channel (R0,R3) in the butterfly network 101 becomes channel (R00, R10) in the flattened butterfly network at 102. Because channels in a flattened butterfly are symmetrical, each line in the flattened butterfly networks at 102 and 202 represents a bidirectional channel (i.e. two unidirectional channels), while each line in the traditional butterfly networks shown at 101 and 201 represents a unidirectional channel.

A k-ary n-flat, the flattened butterfly derived from a k-ary n-fly, is composed of N/k radix $k'=n(k-1)+1$ routers where N is the size of the network. The routers are connected by channels in $n'=n-1$ dimensions, corresponding to the n−1 columns of inter-rank wiring in the butterfly. In each dimension d, from 1 to n', router i is connected to each router j given by $j=kd((i/kd)+m)$ for m from 0 to k−1, where the connection from i to itself is omitted. For example, in 202 of FIG. 2, R4' is connected to R5' in dimension 1, R6' in dimension 2, and R0' in dimension 3.

Figure 3:
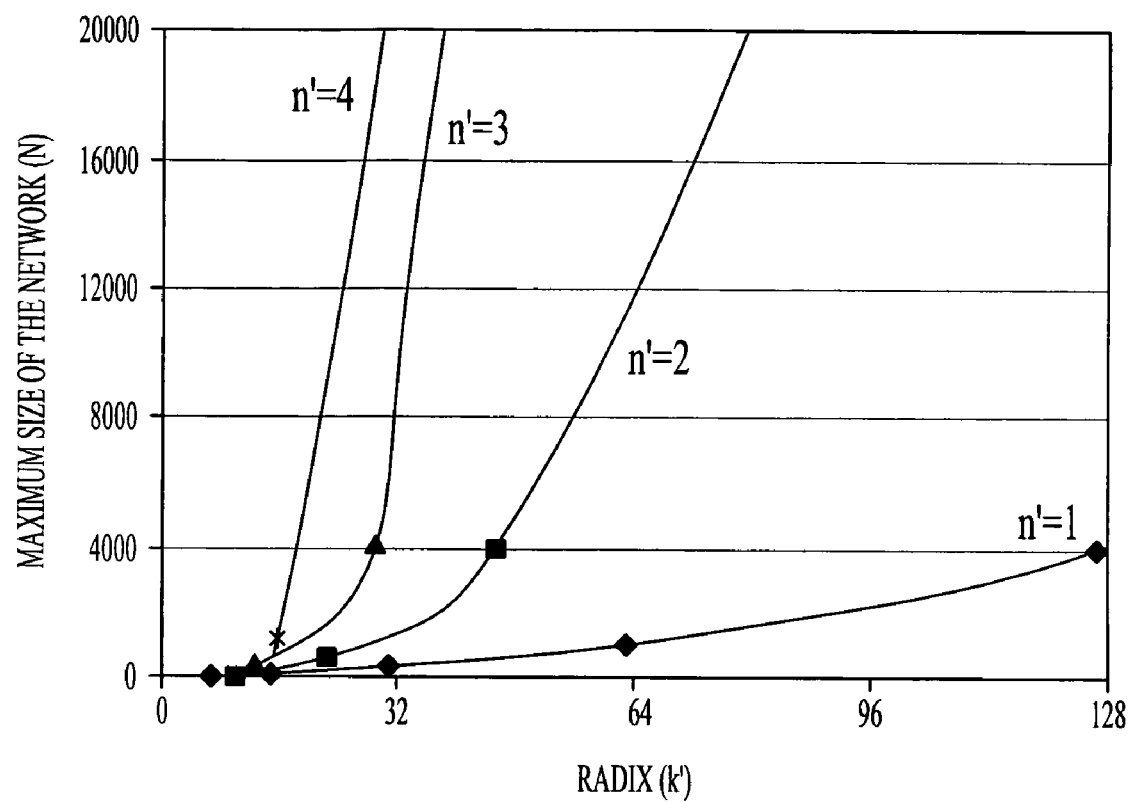
FIG. 3 is a graph illustrating the relationship between the number of nodes N, the number of dimensions n', and the radix k' of a flattened butterfly network, consistent with an example embodiment of the invention.

The number of nodes (N) in a flattened butterfly is plotted as a function of number of dimensions n' and switch radix k' in FIG. 3. The figure shows that the number of dimensions needed to produce very large networks is kept to reasonably small numbers best with relatively high radix routers, implying that the flattened butterfly topology is best suited for high-radix routers when large network scalability is desired. Networks of very limited size can be built using low-radix routers (k'<16) and even with k'=32 many dimensions are needed to scale to large network sizes. However with k'=61, a network with just three dimensions scales to 64K nodes.

Routing in a flattened butterfly in one example involves a hop from a node to its local router, zero or more inter-router hops, and a final hop from a router to the destination node. If we label each node with a n-digit radix-k node address, an inter-router hop in dimension d changes the dth digit of the current node address to an arbitrary value, and the final hop sets the $0^{th}$ (rightmost) digit of the current node address to an arbitrary value. Thus, to route minimally from node a=a(n−1), . . . , a(0) to node b=b(n−1), . . . , b(0) where a and b are n-digit radix k node addresses involves taking one inter-router hop for each digit, other than the rightmost, in which a and b differ.

For example, in FIG. 1(d) routing from node 0 ($0000_2$) to node 10 ($1011_2$) requires taking inter-router hops in dimensions 1 and 3. These inter-router hops can be taken in either order giving two minimal routes between these two nodes. In general, if two nodes a and b have addresses that differ in j digits (other than the rightmost digit), then there are j! minimal routes between a and b. This path diversity derives from the fact that a packet routing in a flattened butterfly is able to traverse the dimensions in any order, while a packet traversing a conventional butterfly must visit the dimensions in a fixed order, leading to no path diversity.

Routing non-minimally in a flattened butterfly provides additional path diversity and can achieve load-balanced routing for arbitrary traffic patterns. Consider, for example, the flattened butterfly network of 102 in FIG. 1 and suppose that all of the traffic from nodes 0-3 (attached to router R00) was destined for nodes 4-7 (attached to R10). With minimal routing, all of this traffic would overload channel (R00,R10). By misrouting a fraction of this traffic to R20 and R30, which then forward the traffic on to R10, load is balanced. With non-minimal routing, a flattened butterfly is able to match the load-balancing (and nonblocking) properties of a Clos network—in effect acting like a flattened Clos.

The flattened butterfly is similar to a generalized hypercube (GHC) topology, but improves on the GHC in at least two main ways. First, the flattened butterfly connects k terminals to each router while the GHC connects only a single terminal to each router. Adding this k-way concentration makes the flattened butterfly much more economical than the GHC—reducing its cost by a factor of k, improves its scalability, and makes it more suitable for implementation using high-radix routers. The generalized hypercube is a k-ary n-cube network that uses a complete connection, rather than a ring, to connect the nodes in each dimension. In the 1980s, when this topology was proposed, limited pin bandwidth made the GHC topology prohibitively expensive at large node counts. Also, without load-balancing global adaptive routing, the GHC has poor performance on adversarial traffic patterns.

For example, routers used in a 1K node network of a flattened butterfly with 1 dimension and a (8,8,16) GHC are considered. With 32-terminal nodes per router, the terminal bandwidth of the flattened butterfly is matched to the inter-router bandwidth. In the GHC, on the other hand, there is a mismatch between the single terminal channel and 32 inter-router channels. If the inter-router channels are of the same bandwidth as the terminal channel, the network will be prohibitively expensive and utilization of the inter-router channels will be low. If the inter-router channels are sized at 1/32 the bandwidth of the terminal channel, serialization latency will make the latency of the network prohibitively high and the overall bandwidth of the router will be low, making poor use of the high-pin bandwidth of modern VLSI chips.

The second improvement over the GHC is the use of non-minimal globally-adaptive routing to load balance adversarial traffic patterns and the use of adaptive-Clos routing with sequential allocators to reduce transient load imbalance. These modern routing algorithms enable the flattened butterfly to match the performance of a Clos network on adversarial traffic patterns. In contrast, a GHC using minimal routing is unable to balance load and hence suffers the same performance bottleneck as a conventional butterfly on adversarial traffic.

A variety of routing algorithms are implemented on various embodiments of the flattened butterfly network, including minimal adaptive (MIN AD), Valiant's non-minimal oblivious algorithm (VAL), the UGAL non-minimal adaptive algorithm (UGAL), a variant of UGAL using sequential allocation (UGAL-S), and non-minimal adaptive routing in a flattened Clos (CLOS AD).

We consider routing in a k-ary n-flat where the source node s, destination node d, and current node c are represented as n-digit radix-k numbers, e.g., $s_{n-1}, \ldots, s_0$. At a given step of the route, a channel is productive if it is part of a minimal route; that is, a channel in dimension j is productive if $c_j \neq d_j$ before traversing the channel, and $c_j = d_j$ after traversing the channel.

We assume an input-queued virtual channel router. Adaptive algorithms estimate output channel queue length using the credit count for output virtual channels which reflects the occupancy of the input queue on the far end of the channel. For MIN AD and UGAL, the router uses a greedy allocator: during a given routing cycle, all inputs make their routing decisions in parallel and then, the queuing state is updated en mass. For UGAL-S and CLOS AD, the router uses a sequential allocator where each input makes its routing decision in sequence and updates the queuing state before the next input makes its decision.

Minimal Adaptive (MIN AD): The minimal adaptive algorithm operates by choosing for the next hop the productive channel with the shortest queue. To prevent deadlock, n0 virtual channels (VCs) [7] are used with the VC channel selected based on the number of hops remaining to the destination.

Valiant (VAL): Valiant's algorithm load balances traffic by converting any traffic pattern into two phases of random traffic. It operates by picking a random intermediate node b, routing minimally from s to b, and then routing minimally from b to d. Routing through b perfectly balances load (on average) but at the cost of doubling the worst-case hop count, from n0 to 2n0. While any minimal algorithm can be used for each phase, our evaluation uses dimension order routing. Two VCs, one for each phase, are needed to avoid deadlock with this algorithm.

Universal Globally-Adaptive Load-balanced (UGAL, UGAL-S): UGAL chooses between MIN AD and VAL on a packet-by-packet basis to minimize the estimated delay for each packet. The product of queue length and hop count is used as an estimate of delay. With UGAL, traffic is routed minimally on benign traffic patterns and at low loads, matching the performance of MIN AD, and non-minimally on adversarial patterns at high loads, matching the performance of VAL. UGAL-S is identical to UGAL but with a sequential allocator.

Adaptive Clos (CLOS AD): Like UGAL, the router chooses between minimal and non-minimal on a packet-by packet basis using queue lengths to estimate delays. If the router chooses to route a packet non-minimally, however, the packet is routed as if it were adaptively routing to the middle stage of a Clos network. A non-minimal packet arrives at the intermediate node b by traversing each dimension using the channel with the shortest queue for that dimension (including a "dummy queue" for staying at the current coordinate in that dimension). Like UGAL-S, CLOS AD uses a sequential allocator. The routing is identical to adaptive routing in a Clos where the Clos is flattened into the routers of the flattened butterfly. Thus, the intermediate node is chosen from the closest common ancestors and not among all nodes. As a result, even though CLOS AD is non-minimal routing, the hop count is always equal or less than that of a corresponding folded-Clos network.

Evaluation of these various routing algorithms by simulation is considered in a 32-ary 2-flat flattened butterfly topology having k'=63, n'=1 and N=1024. We evaluate the different routing algorithms on the flattened butterfly using both benign and adversarial traffic patterns. Uniform random (UR) traffic is a benign traffic pattern that balances load across the network links. Thus, minimal routing is sufficient for such traffic patterns and all of the routing algorithms except VAL achieve 100% throughput. VAL achieves only half of network capacity regardless of the traffic pattern. In addition, VAL adds additional zero-load latency with the extra hop count associated with the intermediate node.

We simulate an adversarial traffic pattern where each node associated with router Ri sends traffic to a randomly selected node associated with router Ri+1. With this traffic pattern, all of the nodes connected to a router will attempt to use the same inter-router channel. Non-minimal routing is required to load balance this traffic pattern by spreading the bulk of the traffic across the other inter-router channels. We compare the performance of the routing algorithms on this pattern, and MIN is limited to $\frac{1}{32}$ or approximately 3% throughput while all of the non-minimal algorithms achieve 50% throughput (the maximum possible on this traffic).

With the adversarial traffic pattern, CLOS AD provides much lower latency near saturation—nearly half the latency of UGAL-S at an offered load of 0.45. This reduction in latency is analogous to the reduction in latency achieved by adaptive routing compared to oblivious routing in a Clos network. Because CLOS AD adaptively picks the intermediate node, it is able to dynamically load balance traffic across the intermediate nodes and links. VAL, UGAL, and UGAL-S obliviously pick the intermediate node which balances average traffic across nodes and links but results in transient load imbalance that increases latency.

To highlight the effects of transient load imbalance, we consider the time required by each algorithm to deliver a batch of traffic normalized to batch size. We use the adversarial traffic pattern described earlier. As the batch size increases, the normalized latency approaches the inverse of the routing algorithm throughput. For small batch sizes, however, batch latency is affected by transient load imbalance. On these small batches, UGAL performs very poorly because of the greedy nature of its allocator. When the minimal queue is short, all inputs pick the minimal queue (overloading this output) before the queuing state is updated. With UGAL-S, the transient load imbalance due to greedy allocation is eliminated, but transient load imbalance across intermediate nodes remains. VAL also shares this transient load imbalance. CLOS AD eliminates both sources of transient load imbalance.

Both CLOS AD and UGAL-S include sequential allocations which can increase the router clock cycle or the pipeline depth if they are implemented sequentially. However, these algorithms can be implemented using parallel prefix schemes to speed up the computation. Although CLOS AD provides performance benefit over UGAL-S, it leads to a higher complexity implementation since it requires comparing the depth of all of the non-minimal queues.

Evaluation of the cost of a flattened butterfly topology relative to other network topologies is also considered, including an approximate cost of a router ($390) derived from the router chip ($90) and development of the router ($300), links on the same backplane ($2.00), electrical links ($5.00), and optical (long) links ($220). In an alternate analysis, long optical links are replaced with copper links and repeaters, at some performance detriment.

Figure 4:
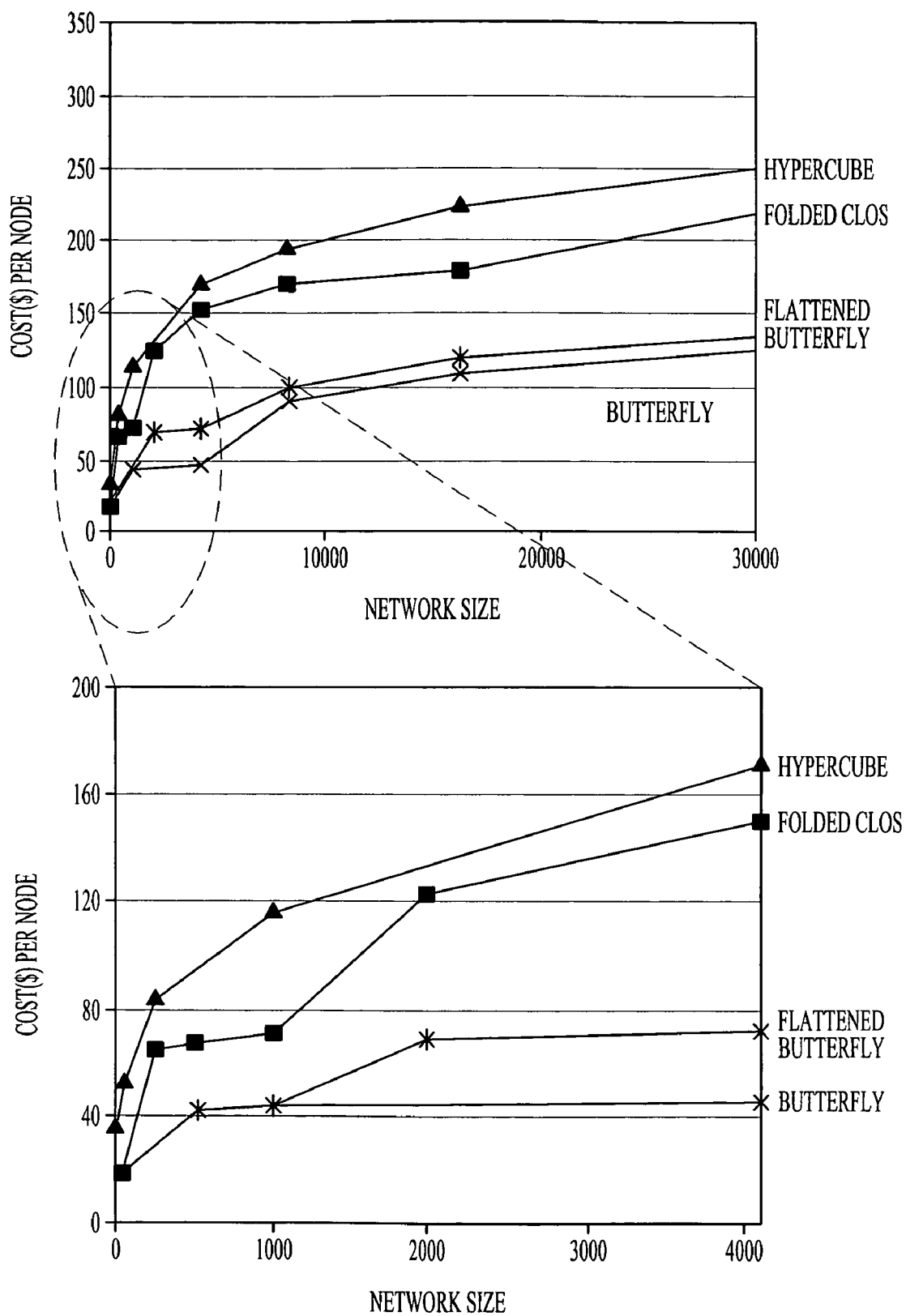
FIG. 4 is a graph and a magnified view of a portion of the graph illustrating network size in nodes v. cost per node for a variety of network topologies, including a flattened butterfly network topology consistent with an example embodiment of the invention.

In the resulting analysis, the cost per node to add additional nodes is superior to the folded clos and hypercube networks by approximately half the cost of a hypercube or folded clos node as shown in FIG. 4, while only slightly more expensive than the cost per additional node for larger numbers of nodes in a traditional butterfly network. Because the folded butterfly provides various routing and performance advantages relative to a traditional butterfly network, the slight added cost is more than compensated by improved overall processor interconnect network performance.

Other performance factors such as wire delay and power consumption have also been modeled. Although a flattened butterfly topology often results in longer average cable lengths than folded clos or hypercube networks, the folded butterfly network can often have a smaller wire delay than an equivalent folded clos network due to locality of traffic and relatively close physical distance between nodes of a flattened butterfly. Power consumption is similarly a result of link and switch power, and is increasingly a concern in large network design. Because the flattened butterfly has relatively high packaging locality and a small number of relatively local hops relative to folded clos or hypercube networks, the flattened butterfly typically consumes less power than the folded clos network and as little as half that of a comparable hypercube network.

The examples presented here illustrate some embodiments of the flattened butterfly topology that exploit recent developments in high-radix routers and global adaptive routing to give a cost-effective network. The flattened butterfly gives lower hop count than a folded Clos and better path diversity than a conventional butterfly. As a result, the flattened butterfly is approximately half the cost of a folded Clos network of identical capacity on load-balanced traffic.

On adversarial traffic, the flattened butterfly exploits global adaptive routing to match the cost/performance of the folded Clos. Using a detailed cost model, that accounts for packaging and the effect of distance on channel cost, we have compared the cost of the flattened butterfly to the cost of a folded Clos, a conventional butterfly, and a hypercube network—all with identical capacity. Our analysis shows that the flattened butterfly provides 35-53% cost reduction compared to the folded Clos. The exact reduction depends on network size. Our cost model also shows that the total interconnection network cost is dominated by channel cost—and in particular the cost of long, global channels. Our analysis also demonstrates that the flattened butterfly is able to exploit packaging locality, unlike the folded-Clos or conventional butterfly.

We evaluate five routing algorithms for the flattened butterfly including both minimal and non-minimal and both adaptive and oblivious. We also compare routing algorithms using both greedy and sequential allocators. We show that non-minimal globally-adaptive routing is necessary to load-balance the topology on adversarial traffic and that global adaptive routing is needed to provide good performance on both benign and adversarial traffic. Our routing studies demonstrate that transient load imbalance occurs in high-radix routers with greedy allocators but that CLOS AD routing algorithm with a sequential allocator overcomes this problem.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

We claim:

1. A multiprocessor computer system, comprising a flattened butterfly processor interconnect network, the flattened butterfly interconnect network comprising a network derived from a traditional butterfly processor interconnect network by flattening routers in each row into a single router for each row, and eliminating channels entirely local to the single row.

2. The multiprocessor computer system of claim 1, wherein the flattened butterfly interconnect network further comprises forming two-way channels from the symmetrical links resulting from flattening a traditional butterfly interconnect network.

3. The multiprocessor computer system of claim 1, further comprising network nodes that are operable to route data using at least one of minimal adaptive (MIN AD), Valiant's non-minimal oblivious algorithm (VAL), the UGAL non-minimal adaptive algorithm (UGAL), a variant of UGAL using sequential allocation (UGAL-S), and non-minimal adaptive routing in a flattened Clos (CLOS AD) routing algorithms.

4. The multiprocessor computer system of claim 1, further comprising network nodes that are operable to route data using non-minimal globally-adaptive routing.

5. A data communication network, comprising a flattened butterfly processor network topology, the flattened butterfly network topology comprising a network derived from a traditional butterfly topology network by flattening routers in each row into a single router for each row, and eliminating channels entirely local to the single row.

6. The data communication network of claim 5, wherein the flattened butterfly topology network further comprises forming two-way channels from the symmetrical links resulting from flattening a traditional butterfly topology network.

7. The data communication network of claim 5, further comprising network nodes that are operable to route data using at least one of minimal adaptive (MIN AD), Valiant's non-minimal oblivious algorithm (VAL), the UGAL non-minimal adaptive algorithm (UGAL), a variant of UGAL using sequential allocation (UGAL-S), and non-minimal adaptive routing in a flattened Clos (CLOS AD) routing algorithms.

8. The data communication network of claim 5, further comprising network nodes that are operable to route data using non-minimal globally-adaptive routing.

9. A method of operating a multiprocessor computer system, comprising communicating data between processing nodes via a flattened butterfly processor interconnect network, the flattened butterfly interconnect network comprising a network derived from a traditional butterfly processor interconnect network by flattening routers in each row into a single router for each row and eliminating channels entirely local to the single row.

10. The method of operating a multiprocessor computer system of claim 9, wherein deriving the flattened butterfly interconnect network further comprises forming two-way channels from the symmetrical links resulting from flattening a traditional butterfly interconnect network.

11. The method of operating a multiprocessor computer system of claim 9, wherein communicating data between processing nodes via a flattened butterfly processor interconnect network comprises routing data using at least one of minimal adaptive (MIN AD), Valiant's non-minimal oblivious algorithm (VAL), the UGAL non-minimal adaptive algorithm (UGAL), a variant of UGAL using sequential allocation (UGAL-S), and non-minimal adaptive routing in a flattened Clos (CLOS AD) routing algorithms.

12. The method of operating a multiprocessor computer system of claim 9, wherein communicating data between processing nodes via a flattened butterfly processor interconnect network comprises routing data using non-minimal globally-adaptive routing.

13. A method of operating a communications network comprising communicating data in a flattened butterfly processor network topology, the flattened butterfly network topology comprising a network derived from a traditional butterfly topology network by flattening routers in each row into a single router for each row and eliminating channels entirely local to the single row.

14. The method of operating a communications network of claim 13, wherein the flattened butterfly topology network further comprises forming two-way channels from the symmetrical links resulting from flattening a traditional butterfly topology network.

15. The method of operating a communications network of claim 13, wherein communicating data between processing nodes via a flattened butterfly processor interconnect network comprises routing data using at least one of minimal adaptive (MIN AD), Valiant's non-minimal oblivious algorithm (VAL), the UGAL non-minimal adaptive algorithm (UGAL), a variant of UGAL using sequential allocation (UGAL-S), and non-minimal adaptive routing in a flattened Clos (CLOS AD) routing algorithms.

16. The method of operating a communications network of claim 13, wherein communicating data between processing nodes via a flattened butterfly processor interconnect network comprises routing data using non-minimal globally-adaptive routing.

17. A multiprocessor computer system, comprising:
a flattened butterfly processor interconnect network.

18. A method of communicating data between processing nodes in a multiprocessor computer system, comprising routing data between nodes in a flattened butterfly topology.

* * * * *